United States Patent
Young et al.

(10) Patent No.: US 7,135,838 B2
(45) Date of Patent: Nov. 14, 2006

(54) POWER-ON DEVICE AND METHOD FOR CONTROLLABLY POWERING A CIRCUIT SYSTEM WITH AN ADAPTOR OR WITH A BATTERY

(75) Inventors: Sea-Weng Young, Pingtung (TW); Chun-Chi Hsu, Sanchung (TW); Wen-Bin Liu, Junghe (TW)

(73) Assignee: BENQ Corporation, Taoyuan (TW)

( * ) Notice: Subject to any disclaimer, the term of this patent is extended or adjusted under 35 U.S.C. 154(b) by 81 days.

(21) Appl. No.: 10/612,100

(22) Filed: Jul. 1, 2003

(65) Prior Publication Data
US 2004/0004463 A1 Jan. 8, 2004

(30) Foreign Application Priority Data
Jul. 3, 2002 (TW) .............................. 91114698 A

(51) Int. Cl.
H02J 7/00 (2006.01)
(52) U.S. Cl. ........................ 320/134; 320/128
(58) Field of Classification Search ................ 320/134, 320/128, 149, 132, 137, 155, 161, 127, 164, 320/166; 324/426; 363/59, 60
See application file for complete search history.

(56) References Cited
U.S. PATENT DOCUMENTS
4,163,193 A * 7/1979 Kamiya ....................... 324/436
6,744,698 B1 * 6/2004 Koyama et al. ............. 368/204
2001/0028571 A1 * 10/2001 Hanada et al. ................ 363/50
2002/0171400 A1 * 11/2002 Koyama et al. ............. 320/135
2004/0046528 A1 * 3/2004 Soyer .......................... 320/137

FOREIGN PATENT DOCUMENTS
JP 2000-139037 * 5/2000
TW 448600 12/1999
TW 448600 8/2001

* cited by examiner

Primary Examiner—Donald Sparks
Assistant Examiner—Lawrence Luk
(74) Attorney, Agent, or Firm—Ladas & Parry LLP

(57) ABSTRACT

A power-on method for a circuit system having a power supply terminal and a charge input terminal, comprising: coupling the power supply terminal to a battery and the charge input terminal to an adaptor; detecting a voltage of the battery; when the voltage of the battery is below a threshold, turning on a second switch such that the adaptor supplies the circuit system through the charge input terminal and the second switch to start the circuit system and charge the battery; when the voltage of the battery is above the threshold, turning off the second switch, and turning on a third switch, such that the charge input terminal is coupled to the battery through the third switch, and the circuit system is powered by the battery; and outputting a switch signal to control a first switch coupled between the adaptor and the charge input terminal for controlling charge capacity.

14 Claims, 2 Drawing Sheets

POWER-ON DEVICE AND METHOD FOR CONTROLLABLY POWERING A CIRCUIT SYSTEM WITH AN ADAPTOR OR WITH A BATTERY

BACKGROUND OF THE INVENTION

1. Field of the Invention

The present invention relates to a power-on device, and particularly to a power-on device that switches power supplies dynamically according to voltages of batteries to prevent charge capacities of batteries from falling too low to start immediately, circuit systems such as handsets supplied by batteries.

2. Description of the Related Art

Generally, most handsets, laptops and other portable electronics are primarily supplied by batteries, which meet requirements of portability. Batteries have a tendency to self-discharge. When handsets are turned off or batteries are removed from handsets, batteries return to the lowest form of energy. The amount of self-discharge differs with each system and cell design. NiCd and NiMH battery chemistries exhibit an inherently high self-discharge. Poor manufacturing practices and improper use can accelerate this phenomenon. Owing to limits of volume, batteries can have limited charge capacities. Unused after a long time, batteries have too low a charge to start handsets and display handset states, such as charge capacities, proving to be quite inconvenient.

SUMMARY OF THE INVENTION

It is therefore an object of the present invention to provide a circuit system with a control circuit for charging. The control circuit detects charge capacities, thereby switching power supplies accordingly. When charge capacities are too low, the circuit is supplied by an adaptor to power on and display circuit system states. When charge capacities are adequate to start, the circuit system is supplied by batteries and the adaptor charges the battery until full.

To achieve the above objects, the present invention provides a power-on device for the circuit system. The circuit system has a power supply terminal coupled to a battery and a plug inserted into an adaptor. The power-on device includes a voltage detector having an input terminal coupled to the battery. When voltage of the input terminal is below a threshold voltage, the voltage detector outputs a control signal having a first level to enable a path which the adaptor supplying the circuit system charges the battery through the plug. When voltage of the input terminal is above the threshold voltage, the voltage detector outputs the control signal having a second level to enable another path such that the circuit system is coupled to the battery and it is the battery that supplies the circuit system.

As well, the power-or device includes a first switch, a second switch, a third switch, a first diode, a second diode, and an inverter. An input terminal of the first switch is coupled to the plug, a control terminal of the first switch receives a first signal from the circuit system. When the control terminal of the first switch has a low level, the first switch is turned on. When the control terminal of the first switch has a high level, the first switch is turned off. The first signal is preset at high level. An anode of the first diode is coupled to an output terminal of the first switch and a cathode of the first diode is coupled to a charge input terminal of the circuit system. An input terminal of the second switch is coupled to the plug and a control terminal of the second switch is coupled to an output terminal of the voltage detector. When the control terminal of the second switch has a low level, the second switch is turned on. When the control terminal of the second switch has a high level, the second switch is turned off. An anode of the second diode is coupled to an output terminal of the second switch and a cathode of the second diode is coupled to a charge input terminal of the circuit system. An anode of the third diode is coupled to an output terminal of the second switch and a cathode of the third diode is coupled to the battery. An input terminal of the inverter is coupled to the output terminal of the voltage detector. An input terminal of the third switch is coupled to the charge input terminal of the circuit system, a control terminal of the third switch is coupled to an output terminal of the inverter, and an output terminal of the third switch is coupled to the battery. When the control terminal of the third switch has a low level, the third switch is turned on. When the control terminal of the third switch has a high level, the third switch is turned off.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

A power-on device provided by the present invention is illustrated by an example of a handset. It is not limited to handsets but also to other electronic devices. The power-on device has complete functions for charging, enabling the charging system to start and display handset states.

Figure 1:
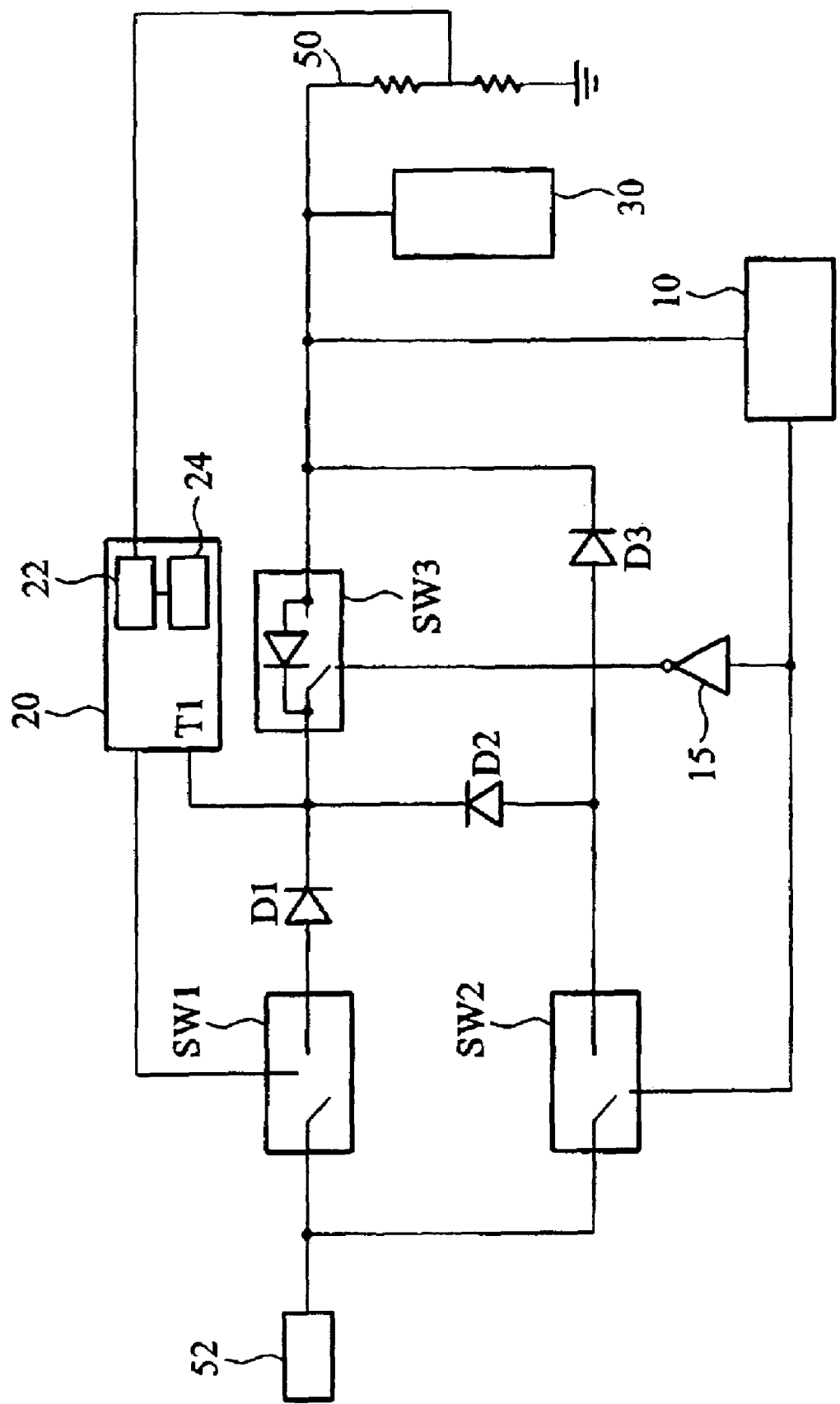
FIG. 1 shows a block diagram of the power-on device in the present invention.

FIG. 1 shows a block diagram of the power-on device in the present invention. As shown in FIG. 1, a plug 52 of the power-on device is coupled to an adaptor. An input terminal of a first switch SW1 is coupled to the plug 52. A control terminal of the first switch SW1 receives a first signal from a circuit system 20. When the control terminal of the first switch SW1 has a low level, the first switch is turned on. When the control terminal of the first switch SW1 has a high level, the first switch is turned off. The first signal is preset at high level. An anode of the first diode D1 is coupled to an output terminal of the first switch SW1. A cathode of the first diode is coupled to a charge input terminal T1 of the circuit system. An input terminal of the second switch SW2 is coupled to the plug 52. A control terminal of the second switch SW2 is coupled to an output terminal of the voltage detector 10. An output terminal of the second switch SW2 is coupled to an anode of a second diode D2. When the control terminal of the second switch SW2 has a low level, the second switch SW2 is turned on. When the control terminal of the second switch SW2 has a high level, the second switch SW2 is turned off. An anode of the second diode D2 is coupled to an output terminal of the second switch SW2. A cathode of the second diode D2 is coupled to a charge input terminal T1 of the circuit system 20. An anode of the third diode D3 is coupled to an output terminal of the second switch SW2. A cathode of the third diode D3 is coupled to a battery 30. An input terminal of the inverter 15 is coupled to the output terminal of the voltage detector 10. An input terminal of the third switch SW3 is coupled to the charge input terminal Ti of the circuit system 20. A control terminal of the third switch SW3 is coupled to an output terminal of the inverter 15. An output terminal of the third switch SW3 is coupled to the battery 30. When the control terminal of the third switch SW3 has a low level, the third switch SW3 is turned on. When the control terminal of the third switch SW3 has a high level, the third switch SW3 is turned off.

An input terminal of a resistor divider 50 is coupled to the battery 30. An output terminal of the resistor divider 50 is coupled to an analog-to-digital converter 22 in the circuit system 20. An output terminal of the analog-to-digital converter 22 is coupled to a display panel 24 in the circuit system 20 to display charge capacity of the battery 30. An input terminal of the voltage detector 10 is coupled to the battery 30. When output voltage of the battery 30 is below a threshold voltage, for example 3.2 V, not enough to start the circuit system 20, an output terminal of the voltage detector 10 outputs low level. Therefore, the second switch SW2 is turned on. The adaptor supplies the charge input terminal T1 of the circuit system 20 through the plug 20, the second switch SW2, and the second diode D2. Meanwhile, the adaptor charges the battery 30 through the plug 20, the second switch SW2, and the third diode D3. An input voltage of the battery 30 is converted by the resistor divider 50 and the analog-to-digital converter 22, the display panel 24 thereby showing charge capacity of the battery 30. The first signal from the circuit system 20 is preset at high level, so the first switch SW1 is turned off. The output terminal of the voltage detector 10 has a low level, so the output terminal of the inverter 15 has a high level and the third switch SW3 is turned off.

When output voltage of the battery 30 is above a threshold voltage, for example 3.2 V, enough to start the circuit system 20, an output terminal of the voltage detector 10 outputs high level. Therefore, the second switch SW2 is turned off. The output terminal of the voltage detector 10 has a high level, so the output terminal of the inverter 15 has a low level and the third switch SW3 is turned on. The battery 30 supplies the charge input terminal T1 of the circuit system 20 to maintain normal operation. The circuit system 20 turns on or turns off the first switch SW1 by the first signal to control charging of the battery 30.

Figure 2:
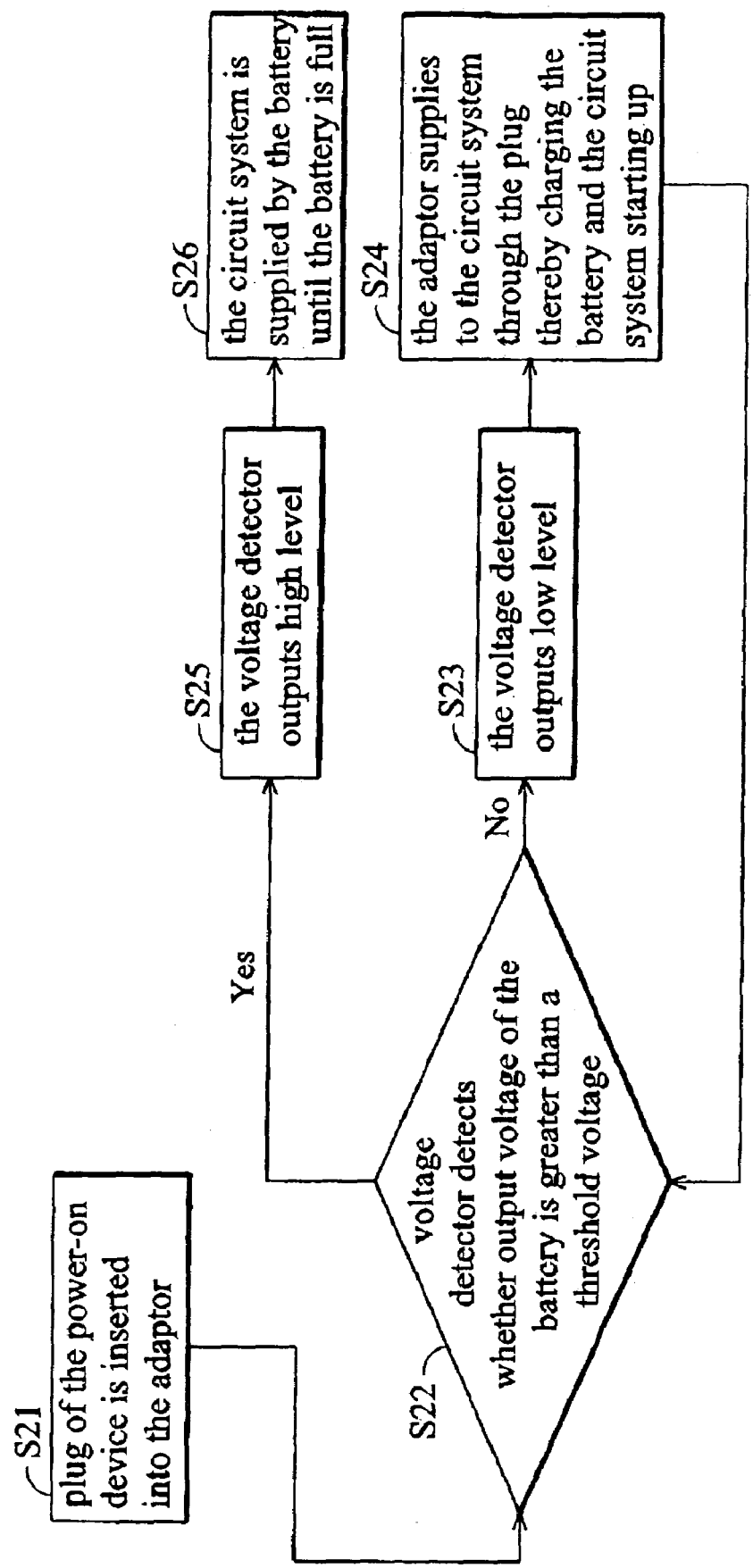
FIG. 2 shows a flowchart of the power-on device in the present invention.

FIG. 2 shows a flowchart of the power-on device in the present invention.

At step S21, the plug of the power-on device is inserted into the adaptor.

At step S22, the voltage detector detects output voltage of the battery.

At step S23, wherein, when output voltage of the battery is below a threshold voltage, the voltage detector outputs low level.

At step S24, the adaptor supplies the circuit system through the plug thereby charging the battery and starting the circuit system.

At step S25, wherein, when output voltage of the battery is above a threshold voltage, the voltage detector outputs high level.

At step S26, the circuit system is supplied by the battery.

Although the present invention has been described in i-s preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A power-on device for a circuit system having a power supply terminal coupled to a battery and a charge input terminal coupled to an adaptor, the power-on device comprising:
    a voltage detector, having an input terminal and an output terminal, wherein the input terminal is coupled to the battery;
    a first switch having a first input terminal, a first output terminal, and a first control terminal, wherein the first input terminal is coupled to the adaptor, and the first control terminal receives a first signal from the circuit system;
    a first diode having a first positive electrode and a first negative electrode, wherein the first positive electrode is coupled to the first output terminal, and the first negative electrode is coupled to the charge input terminal;
    a second switch having a second input terminal, a second output terminal, and a second control terminal, wherein the second input terminal is coupled to the adaptor, and the second control terminal is coupled to the output terminal of the voltage detector;
    a second diode having a second positive electrode and a second negative electrode, wherein the second positive electrode is coupled to the second output terminal, and the second negative electrode is coupled to the charge input terminal;
    a third diode having a third positive electrode and a third negative electrode, wherein the third positive electrode is coupled to the second output terminal, and the third negative electrode is coupled to the battery;
    an inverter having an input terminal and an output terminal, wherein the input terminal of the inverter is coupled to the output terminal of the voltage detector; and
    a third switch having a third input terminal, a third output terminal, and a third control terminal, wherein the third input terminal is coupled to the charge input terminal, the third control terminal is coupled to the output terminal of the inverter, and the third output terminal is coupled to the battery, wherein:
    when a voltage of the input terminal is below a threshold voltage, the output terminal outputs a control signal having a first level such that the adaptor supplies the circuit system through the charge input terminal to start the circuit system and charge the battery;
    when a voltage of the input terminal is above the threshold voltage, the output terminal outputs the control signal having a second level such that the battery supplies the circuit system;
    when the first control terminal has the first level, the first switch is turned on;
    when the first control terminal has the second level, the first switch is turned off, and the first signal is preset at the second level;
    when the second control terminal has the first level, the second switch is turned on, and when the second control terminal has the second level, the second switch is turned off; and
    when the third control terminal has the first level, the third switch is turned on, and when the third control terminal has the second level, the third switch is turned off.

2. The power-on device as claimed in claim 1 wherein the first level is a low level, and the second level is a high level.

3. The power-on device as claimed in claim 2 further comprising:
   a display panel; and
   an analog-to-digital converter having an input terminal and an output terminal, wherein the input terminal of the analog-to-digital converter is coupled to the battery and the output terminal of the analog-to-digital converter is coupled to the display panel to show charge capacity of the battery.

4. The power-on device as claimed in claim 1 wherein the circuit system is a handset.

5. The power-on method as claimed in claim 1 wherein the threshold voltage is 3.2V.

6. A power-on method for a circuit system having a power supply terminal and a charge input terminal, comprising:
   coupling the power supply terminal to a battery and the charge input terminal to an adaptor;
   detecting a voltage of the battery;
   when the voltage of the battery is below a threshold, turning on a second switch such that the adaptor supplies the circuit system through the charge input terminal and the second switch to start the circuit system and charge the battery;
   when the voltage of the battery is above the threshold, turning off the second switch, and turning on a third switch, such that the charge input terminal is coupled to the battery through the third switch, and the circuit system is powered by the battery; and
   outputting a switch signal from the circuit system to control a first switch coupled between the adaptor and the charge input terminal for controlling charge capacity.

7. The power-on method as claimed in claim 6 wherein:
   when the control signal is at low level, the second switch is turned on and the third switch is turned off; and
   when the control signal is at high level, the second switch is turned off and the third switch is turned on.

8. The power-on method as claimed in claim 6 wherein the threshold voltage is 3.2V.

9. The power-on method as claimed in claim 6 further comprising the step of converging voltage of the battery to display data and displaying the display data to show charge capacity.

10. The power-on method as claimed in claim 6 wherein the circuit system is a handset.

11. The method of claim 6, further comprising:
   controlling the second and third switches by a control signal; and while the circuit system is powered by the battery:
      if the switch signal turns on the first switch, the adaptor charges the battery; and
      if the switch signal turns off the first switch, the adaptor stops charging the battery.

12. A power-on method for a circuit system, comprising:
   coupling a terminal of the circuit system to a battery and the other terminal of the circuit system to an adaptor;
   detecting a voltage of the battery, wherein when the voltage of the battery is below a threshold voltage, the adaptor supplies the circuit system to start the circuit system and charge the battery; and
   detecting a voltage of the battery, wherein when the voltage of the battery is above a threshold voltage, the battery supplies the circuit system; wherein the circuit system is a communication apparatus;
   when the voltage of the battery is below a threshold voltage, a control signal having a first level is output to turn on a second switch such that the adaptor supplies the circuit system through the second switch to start the circuit system and charge the battery;
   when the voltage of the battery is above a threshold voltage the control signal having a second level is output to turn off the second switch and turn on a third switch such that the circuit system is coupled to the battery through the third switch and the battery supplies the circuit system.

13. The power-on method as claimed in claim 12 further comprising the step of converging voltage of the battery to display data and displaying the display data to show charge capacity.

14. The power-on method as claimed in claim 12 wherein the threshold voltage is 3.2V.

* * * * *